United States Patent [19]

Chomet et al.

[11] Patent Number: 4,916,737
[45] Date of Patent: Apr. 10, 1990

[54] SECURE ANTI-PIRACY ENCODED TELEVISION SYSTEM AND METHOD

[75] Inventors: Marc Chomet, Huntington; George Sintchak, Stony Brook, both of N.Y.

[73] Assignee: Teleglobe Pay-TV System, Inc., New York, N.Y.

[21] Appl. No.: 269,997

[22] Filed: Nov. 14, 1988

[51] Int. Cl.⁴ .................. H04N 7/167; H04N 7/00
[52] U.S. Cl. ........................ 380/20; 358/84; 380/19; 455/2
[58] Field of Search ............ 455/2; 380/19, 20; 358/84

[56] References Cited

U.S. PATENT DOCUMENTS

| | | | |
|---|---|---|---|
| 4,225,884 | 9/1980 | Block et al. | 358/84 |
| 4,410,911 | 10/1983 | Field et al. | 380/19 |
| 4,484,217 | 11/1984 | Block et al. | 358/84 |
| 4,710,955 | 12/1987 | Kauffman | 455/2 |
| 4,792,973 | 12/1988 | Gilhousen et al. | 358/84 |
| 4,797,918 | 1/1989 | Lee et al. | 380/20 |

Primary Examiner—Stephen C. Buczinski
Attorney, Agent, or Firm—Eliot S. Gerber

[57] ABSTRACT

A scrambling and descrambling system and method for the video and/or audio portions of a broadcast TV signal, for example, broadcast by cable, microwave or communication satellite, includes a telephone modem at the descrambling receiver decoder box which is periodically, for example once per month for a few seconds, connected to a central computer of the head end operator. The decsrambling decoder box is enabled to receive the telephone call by a digital identification code broadcast periodically and associated with each decoder box. Each decoder box has a digital serial number in its Read-Only Memory (ROM) portion of its CPU (central processing unit) and an Electrically Alterable Read-Only Memory (EAROM) containing an alterable look-up table having for each program code a corresponding descrabling code to enable the descrambler. The central computer calls the descrambler box, receives its temporary serial number code and then, by digital code translated into electrical signals, changes the look-up table to provide a new temporary identification code, unique to that box, for the nex period. Simultaneously, the central computer polls the EAROM to record, by program number, those pay-per-view programs which had been viewed, for billing purposes.

13 Claims, 3 Drawing Sheets

DECODER BIT STREAM

| WORD | CONTENT |
|---|---|
| 1+2 | BOX ID |
| 3 THRU 722 | PROG. # OF SHOW WATCHED |
| 723 | CHECKSUM |

COMPUTER REPLY

| WORD | CONTENT |
|---|---|
| 1+2 | NEW ID |
| 3 | PROG. NUMBER |
| 4 | ASSOCIATED KEY |
| 5 THRU 722 | PROG. # + ASSOCIATED KEY |
| 723 | CHECKSUM |
| 724 THRU 2048 | GARBAGE + SYNCH |

SECURE ANTI-PIRACY ENCODED TELEVISION SYSTEM AND METHOD

BACKGROUND OF THE INVENTION

The present invention relates to subscription television signal scrambling and descrambling systems and methods.

At the present time a number of scrambling-descrambling methods are used to prevent unauthorized viewing of television signals by non-subscribers. For example, the television signal is broadcast by cable, over-the-air microwave system, over-the-air VHF/UHF, or communication satellite, and certain, or all, of the programs on a channel are scrambled. The viewer generally pays a monthly fee and obtains a descrambler box ("decoder box") which is connected between the cable, or antenna, and the television receiving set ("TV set").

In addition to the sample monthly bill for scrambled channels, such as the "HBO" (Home Box Office) channel, there is also available in some areas other types of pay programs. In "Pay-Per-View" ("PPV") the viewer only pays for the pay programs he selects, for example, a boxing, tennis, or other sporting event. In "Impulse Purchasing" the viewer may select the pay-per-view program at the last moment or even after the program has started.

The presently commercially available scrambling-descrambling systems have two basic problems. First, they are not secure against "piracy", which is the use of unauthorized decoder boxes. It is relatively easy, and common, to buy another decoder box, replace one or more of its components, receive scrambled programs and descramble them without paying fees to the broadcaster. Secondly, some systems are not adapted for pay-per-view or impulse purchasing, which is limiting to the marketing of programs.

U.S. Pat. No. 4,115,807 to Pires, incorporated by reference herein, describes a scrambling-descrambling system including a program identification code unique to a program (block of material). If the viewer selects a program, its program identification code is stored, in the memory of the decoder box, for billing by periodic polling on a telephone line by a central computer. In addition, if the subscriber has paid his bill, the central computer supplies new program code numbers for the next month's program which enables the decoder box to continue its descrambling operation. The new program code number is compared to a code which is inserted in the vertical interval of the video signal, to enable the descrambling circuitry. The scrambling-descrambling system used is the video inversion system of Teleglobe's Horowitz U.S. Pat. No. 3,824,232, incorporated by reference herein. Also see U.S. Pat. Nos. 4,528,589; 4,225,884; 4,126,762 and 4,163,254.

In the previous above-mentioned patents, there is no broadcast communication to the decoder box which readies it to receive a telephone call from the central computer. A person may duplicate the information, including the descrambling code, from a legal decoder box and sell it to those with unauthorized boxes.

In Northern Telecom U.S. Pat. No. 4,388,643 broadcast codes are used along with a subscriber number code stored in the decoder box; and a polling central computer is used for billing. The central computer reads out the subscriber's decoder box number ("SN") and a new set of codes ("ICK" and "DK") are furnished to the decoder box. As in other systems, the codes supplied to one legal decoder box may be appropriated and given to those with illegal decoder boxes.

U.S. Pat. No. 4,494,142 to Blonder-Tongue discloses broadcasting a special code addressed only to those decoder boxes having a preset unique address. U.S. Pat. No. 4,325,078 shows the use of a one-time usage magnetic program card which is inserted by the viewer into a card reader to enable the descrambling converter.

In addition to the video inversion system of the Teleglobe-Horowitz patents, various other scrambling-descrambling systems have been patented, all of which are applicable to the security system of the present invention. For example, in M/A Com Linkabit U.S. Pat. No. 4,563,702 video information lines are stored in memory and their order scrambled. Another scrambling-descrambling system is shown in U.S. Pat. No. 4,614,970 to U.S. Computer Systems.

OBJECTIVES AND FEATURES OF THE INVENTION

It is an objective of the present invention to provide a scrambling-descrambling method and system for television broadcasting, by cable, over-the-air or by satellite, which is relatively more secure from unauthorized reception by tampering with the decoder box.

It is a further objective of the present invention to provide such a method and system which may use various scrambling methods which are sufficiently secure so that the picture and audio is unviewable or unhearable without being descrambled.

It is a further objective of the present invention to provide such a method and system which includes automatic polling by a central computer so that the exact programs watched by the viewer may be determined for billing, consumer survey and other purposes.

It is a further objective of the present invention to provide such a method and system which, although it uses telephone line connection, uses the telephone connection so infrequently and for such a short duration so as not to interfere with the normal telephone usage.

It is a further objective of the present invention to provide such a method and system which, with one central computer, may serve millions of viewers.

It is a further objective of the present invention to provide such a method and system which provides for pay-per-view programs and which provides that the pay-per-view programs may be chosen by the viewer at the last moment (impulse purchasing), even after the program has commenced.

It is an objective of the present invention to provide such a method and system which uses relatively low-cost and commercially available processes to produce its custom solid-state integrated circuit (chip).

It is an objective of the present invention to provide such a method and system which permits the broadcaster to determine, in advance, that certain programs may not be viewed by certain receivers and so limit, by category, etc. those receivers which may receive each program.

It is an objective of the present invention to provide such a method and system which is adapted to multi-channel usage, for example, thirty or more scrambled channels, without requiring additional broadcast bandwidth compared to other scrambling systems.

BRIEF DESCRIPTION OF THE DRAWINGS

Other objectives and features of the present invention will be apparent from the following detailed description of the preferred embodiment, taken in conjunction with the accompanying drawings.

In the drawings.

DESCRIPTION OF THE PREFERRED EMBODIMENT

Figure 1:
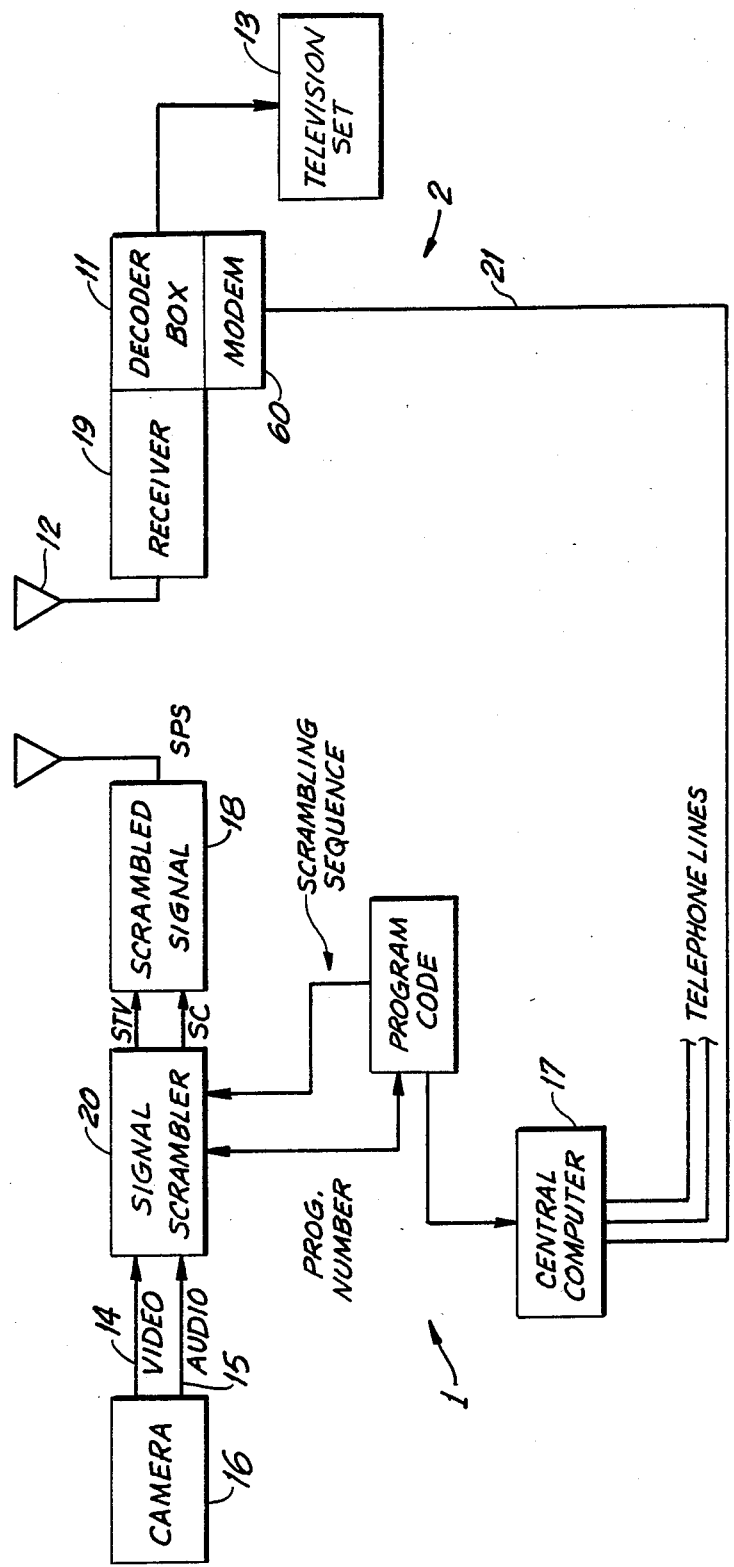
FIG. 1 is a block diagram showing the system of the present invention.

Referring now to FIG. 1, the system according to the present invention generally comprises central station equipment 1 which supplies program signals in a scrambled form to subscriber station equipment 2 at each of the subscriber stations. The scrambled program signal may include scrambled audio and video signals as well as synchronizing signals and codes. The scrambled program signal is supplied to the subscribers either by broadcast or cable.

The broadcast may be, for example, over-the-air UHF/VHF, microwave or using a communication satellite. The embodiment described below uses a multiplex scrambling of the audio and inversion of the video, but alternatively either the video or both audio or video may be scrambled using any of the scrambling techniques mentioned above, or others. The subscriber station equipment 11, called herein a decoder box, is preferably a specially constructed converter box which is connected between the signal input 12 (the cable termination or antenna connection) and the subscribers television set 13.

The audio and video signals 14,15 from a conventional source such as a television camera 16 are applied to a program signal scrambler 20 to produce scrambled audio signals and scrambled video signals STV. In addition, the program signal scrambler 20 provides a scramble code SC for transmission with the scrambled program audio signals. The STV and SC signals from the scrambler 20 are provided to a conventional transmitter 18 for transmission of a scrambled program signal, that includes the code signals, to the subscriber's decoder boxes 11.

A program number 22 PN synchronized with the scrambled audio signal and scramble code provide a program number PN for transmission with the program signals. This program number PN is combined with the scrambled program audio and video and the scramble code for transmission to the subscriber.

The company responsible for transmitting the scrambled program and for billing subscribers, called herein a "central station", may be a cable TV company operating a head end of a cable network, an over-the-air STV operator, or a communications satellite company. The central station equipment 1 includes a billing data gathering central computer 17. The same central computer 17 is preferably used to up-date the subscriber's codes, as explained below. The central computer 17 may be located at any convenient central location and need not be located at the transmission site.

The scrambled program signal SPS from the central station transmitter 18 is received by a program signal receiver 19 at the subscriber decoder box and the received signal is supplied for unscrambling and for control of the unscrambling. The decoder box operates in response to control signals, if it is a legal box and the service has been paid for, to unscramble the incoming program signal and provide unscrambled audio and video signals to a conventional modulator. The modulator modulates a carrier signal of an appropriate carrier frequency with the unscrambled signals and supplies the unscrambled program signal in the form of a modulated carrier wave to the television set 13 antenna terminals in a conventional manner.

The decoder box (converter) 11 provides subscriber control of program viewing. It includes subscriber manipulated controls which permit the subscriber to selectively tune a conventional tuner in order to select a desired program and stores, in its memory, in digital format, data indicating that the subscriber has selected a program for billing purposes.

The decoder box 11 detects digital code signals in the incoming scrambled program signal for unscrambling and billing purposes. The transmitted scrambled code SPS is detected by the decoder box and compared to a stored code held in its memory.

The decoder box 11 detects the transmitted program code PC in the incoming program signal, uses the PC for descrambling, and stores those program codes for the programs which are viewed. The stored program code is supplied, on command, to the modem 60, which is connected to a telephone line 21. The telephone line is the viewer's normal telephone line used for voice communication. Its use by the descrambling system is so infrequent, for example, once per month, and of such short duration, for example, less than 30 seconds, so as not to interfere with the subscriber's normal usage of the telephone. The modem 60 is a conventional telephone digital data modem, preferably operating at 1200 baud.

The audio and video program signals are supplied to the program signal scrambler 20 and are scrambled in any suitable conventional manner. For example, these signals may be scrambled in accordance with the techniques described in Teleglobe-Horowitz U.S. Pat. No. 3,824,232, incorporated by reference herein, through selective inversion of portions of the video signal. The program number PN is inserted into the vertical interval in order to permit unscrambling of the program signals at the subscriber station, as in U.S. Pat. No. 3,824,232.

Each program transmitted in a scrambled form is identified by a digital program number PN which is in the form of bits in the video signal during the vertical retrace interval. In addition to video scrambling, preferably there also is scrambling of the audio. The audio is transmitted on separate subcarriers, preferably eight subcarriers, which are related in frequency by the horizontal frequency "H". The audio is scrambled by time multiplexing the audio base band among the eight subcarriers. Preferably, for example, 4 stereo channels are used with the eight subcarriers. When multiplexed, i.e., rapidly switched on different subcarriers, a single program audio is, at different times, on one of the eight subcarriers. To hear the unscrambled audio it is necessary to track the subcarrier frequency to which the audio channel has been switched. The sequence of subcarriers, and the length of time that an audio channel is on any particular subcarrier, is determined by the descrambling code sequence.

The program signal transmitter 18 combines the video and code signals and transmits the combined signal at an appropriate RF carrier frequency. Each frame of video signals is separated by a vertical retrace interval (vertical synchronization signal) during which equalizing and synchronization pulses are provided along with the code signals.

Figure 2:
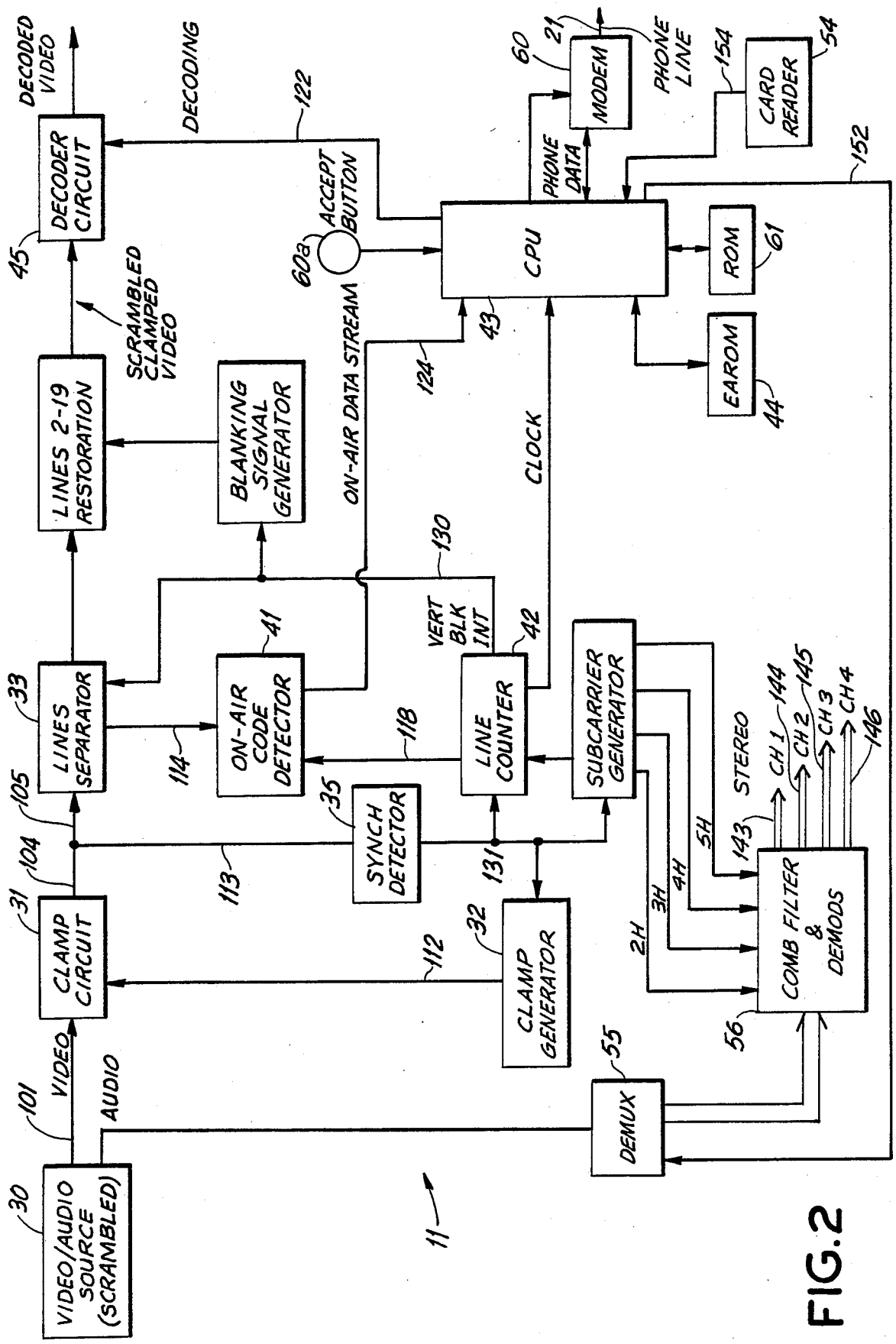
FIG. 2 is a block diagram showing the decoder box of the present invention.

The subscribers decoder box is shown, in block diagram, in FIG. 2. The scrambled video and audio signals are obtained from one form of the demodulator 30, called Video/Audio Source (scrambled). The output 101 of the demodulator is assumed to be floating and unclamped. The signal line 101 enters the clamp circuit 31. The clamp generator 32 provides a clamp signal on line 112 which is applied to the video in clamp circuit 31. The resulting clamped video is fed out on line 34 and goes to both the vertical line separator 33 on line 105 and to a synchronizing signal detector 35 on line 113. The output of the synch detector 35 is fed, on line 131, to the clamp generator 32 as a synchronization signal.

The descrambling code is preferably transmitted on line 2–19 of the vertical interval of the video signal. Each vertical interval contains the descrambling code so that the code may be repeated for each video frame. The information on lines 2–19 of the vertical interval is fed to the on-air code detector 41 on line 114. The vertical interval lines 2–19 contain digital code information which includes, but is not limited to, the Program Number ("PN"), a Market Category Number ("MC"), data to enable the Modem, and other digital data. This on-air data stream is fed to the CPU 43 on line 124 from the code detector 41.

The output of the line counter 42, on line 130, to the line separator 33, is used to key the segment of the vertical interval signal that is to be fed to the on-air code detector 41. The line counter 42 also provides a signal, on line 118, to the on-air code detector 41 so that only the lines with codes are passed through to the CPU 43 on line 124 as the on-air data stream.

The EAROM 44 (Electrically Alterable Read-Only Memory) is a solid-state integrated circuit. It may also be some other form of non-volatile memory. The EAROM can be programmed, by applying external signals to its input ports, a finite number of times by external circuitry and will remain in the last programmed state even when power is removed from its circuit. The EAROM contains, among other things, in its memory, a look-up table. In that look-up table the Program Number is a reference which determines, in a one-to-one correspondence, the descrambling code which is to be used with any particular program. The Program Number is also stored as information to identify which program was watched when the accept button 60 is depressed, for billing and consumer survey purposes. The EAROM 44 also stores the data output of the credit card reader 54, through line 154, when a pay-per-view program is purchased.

The CPU is the Central Processing Unit, a very large-scale solid-state integrated (VLSI) circuit, and is the interpreter and acting agent for instructions stored in its ROM 61 (Read Only Memory). The ROM is programmed at the time of manufacture of the CPU and cannot be changed thereafter. Preferably the ROM is an integral part of the CPU. The CPU 43, via line 152, controls a demultiplexer 55 which connects the subcarrier lines at its output in the correct sequence so that each audio channel appears on its separate lines 138 at all times. In order to eliminate any switching noises and intermodulation products, a comb filter is used in the demodulator 56. Each subcarrier is now demodulated and fed out of the appropriate port (lines 143, 145, 146, 146).

The descrambling information to decode the video is also stored in the EAROM 44. Based on the program number an appropriate code sequence is chosen from the look-up table of the EAROM 44. The CPU 43 feeds the descrambling information, via line 122, to the decoder circuit 45.

The look-up table in the EAROM 44 is changed, preferably monthly, as follows: A signal is sent over-the-air during vertical interval that alerts the MODEM 60 into a state of readiness.

Figure 3:
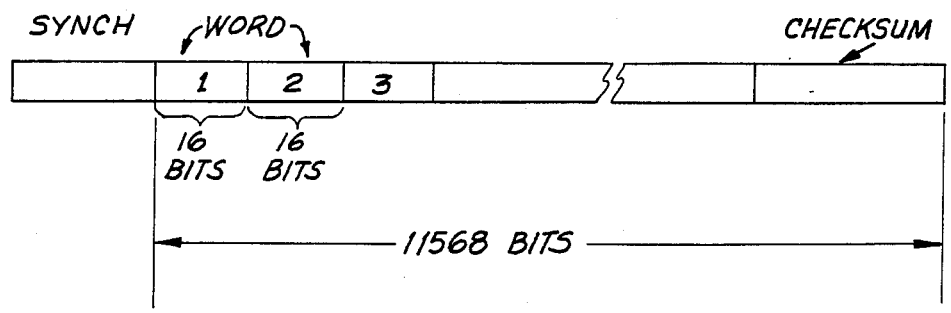
FIG. 3 is a diagram showing the data stream from the central computer to the decoder box.
Figure 3:
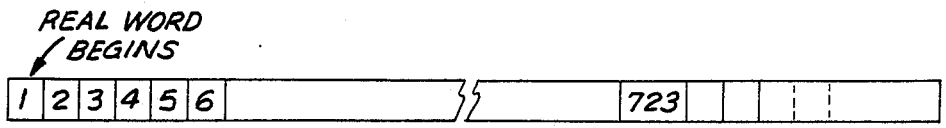

Preferably the on-air coded signal in the vertical interval contains more than one decoder ID, for example, it contains one ID code for every phone line the central computer 17 can use simultaneously, which may be 20–50 lines. After receipt of the ID code signal the decoder box 22 will place "off hook" the local phone as soon as the telephone line is called and before it has a chance to ring in the subscriber's home, to prevent a regular phone call from using the line. At this time, within two seconds after the phone is answered, the central computer 17 sends synch data (garbage) and the internal ID as well as the temporary ID. The internal ID is a code programmed, on manufacture, in the ROM of CPU 43 and is never sent out by the decoder box. However, the central computer 17, whenever it communicates with a decoder box 17, will send to that decoder box its resident ID, in digital code, as a check that is communicating with a valid decoder box. The temporary ID is changed after every contact between the central computer and the decoder box, for example, monthly. The two ID's (resident ID and prior temporary ID) must be correct before the decoder box goes into the next mode. If the ID's are correct then MODEM 60 sends out an acknowledgment tone (a code sequence). The number of its in the data stream for each and every decoder box is exactly the same number. As shown in FIG. 3, only a part of this data bit stream has the desired information. Each decoder has a different starting point. In the example in FIG. 3, there are 2048 different starting points.

After the central computer 17 hears the decoder modem's tone acknowledgment it sends an acknowledging tone of its own to alert the modem to start further transmissions. The decoder MODEM 60 then starts to send 24 bits of clock code to allow the central computer 17 to synchronize the modem clock. Modem 60 then sends 2 sixteen-bit words for the last known decoder box temporary ID number. Then the billing data is sent in the form of 16-bit words 3 through 722. This is followed by a checksum (word 723). The total transmitted is 11568 bits. If there is a false check sum at the central computer 17 it sends the acknowledgment tone once again and the process starts again. Up to three tries will be allowed after which the system will hang up and the central computer 17 will flag the subscriber for service.

If the communication is successful the central computer 17 starts to transmit its reply. This occurs within 100 Ms±3 Ms of the successful receipt of the billing information. The transmission of the new program (look-up table) and temporary ID code data consists of 723 words plus 1325 words of garbage for a total of 32,768 bits. As explained above, the data will start at one of 2048 possible places in the bit stream. Each decoder box is hardwired (within the CPU 43 - VLSI controller chip) for one of these start possibilities. The bit stream start location of each decoder box is noted during manufacture and its data entered into the central computer. For example, if one starts at word 2000, then the next 48 words act as synchronizing signals. When word 1 is reached the central computer 17 sends a new temporary ID number. This temporary ID number, sent in word one and two, replaces the temporary ID number least read-out of the decoder box. The next words thru 722 are the program numbers and their associated descrambling code, i.e., the look-up table. Word 723 contains the checksum and the rest of the data sent until word 1999 is reached will be garbage. The billing information is collected first so that, based on analysis of the billing information the central computer 17 can make further decisions. Since the temporary ID is changed each time contact is made, for example, monthly, there is less likelihood of fooling the computer into completing its transaction.

The entire interchange takes only a few seconds (5-10 seconds) so that over a twenty-four hour period (assuming 5 seconds a contact) the central computer modem can handle 17280 subscribers and with ten modems it can handle 172,280 subscribers. In a typical billing periods of 30 days the system can handle 5,184,000 subscribers. The over-the-air signal only takes about a 30th of a second to transmit so that the number, of over 5 million, subscribers is readily accommodated.

The communication between the decoder CPU 143 and the central computer 17 uses fixed-length bit streams, for example, 32,768 bits long. Of this, 11,568 bits are preferably allocated for actual data, such as the decoder box ID, program numbers, code sequences, and checksums. The rest of the 21,000 bits are used for synchronization and garbage bits. Each decoder box has its data start at one of 2048 possible different points in the data stream. Each word in the data stream will consist of 16 bits. Therefore, a two word (32 bits) sequence can provide over 8 billion ID's. The technique used to form the start of a central office transmission is similar to that described in the Teleglobe-Pires U.S. Pat. No. 4,163,225, incorporated by reference herein.

In order to prevent interception of the signal from the broadcast, there is provided a secure code which takes at least as long to break as any single program length. There are many encoding (crypographic digital codes) systems which have this capability. It is also important to prevent an unauthorized person ("pirate") from duplicating ("cloning") the contents of the ROM portion of CPU 43 and EAROM 44, or altering that ROM and EAROM.

The ROM is an integral part of the CPU solid-state integrated circuit (chip). The ROM is physically incorporated onto the same substrate as the CPU. It is difficult, if not impossible, to avoid the use of the ROM as originally programmed.

The EAROM 44, which is changed in its look-up table and program by appropriate application of signals and is programmed during operation, is protected in the following way. The EAROM 44, in its look-up table, contains the monthly codes and associated program numbers, i.e., for each program number (PN) there is a unique monthly descrambling code (MDC). It also stores a list of the programs watched and a monthly ID number. It is important that physical access to the circuitry of the EAROM be denied, preferably by physically locating it on the same substrate as the CPU.

The system security is improved by requiring telephone contact with the decoder box; changing the temporary ID after every contact between the central computer and the decoder box; starting communication only after a valid ID has been received by the decoder box and downloading new code (look-up table) only after billing read-out and analysis is accomplished; and providing a large number (for example, 2048) of possible starting points of communication for each decoder box.

In addition, the card reader 54 reads the magnetic strip on a plastic credit card. The credit card may be a special credit card sent by the broadcast operator or a general bank or company credit card. In either case the credit card number, and its billing data, stored in EAROM 44, provides an additional security against unauthorized usage. The credit card data, read by credit card reader 54, including its number, is sent via MODEM 60 to central computer 17 whenever there is communication between the decoder box and the central computer. The credit card number may be used for additional security by requiring the subscriber to validate his terminal periodically by reading his card at some time during the billing cycle.

I claim:

1. A method of scrambling a broadcast signal including the steps of:
    converting an unscrambled signal into a scrambled signal, broadcasting said scrambled signal and concurrently broadcasting a descrambling program identification digital code signal, associated with each program of said scrambled signal;
    placing a resident ID digital code box identification number in the read-only memory of a decoder box so that said resident ID code may not be read externally of said decoder box;
    receiving the broadcast signals and descrambling the said scrambled broadcast signals in the decoder box by conveying the descrambling information digital code signal to a descrambling system in said decoder box; enabling the descrambling system under the control of an erasable electrically alterable non-volatile memory in said decoder box having a look-up table consisting of a plurality of digital descrambling codes and corresponding in a one-to-one relationship therewith a plurality of said program identification codes;
    periodically broadcasting a modem enabling code signal to enable the modem in the decoder box; and
    periodically establishing a telephone-modem connection between the decoder box and a central computer immediately after said modem has been enabled, communicating the resident ID code over the telephone connection from the central computer to the decoder box to enable the decoder box to continue to descramble and having the central computer change the entries of the said look-up table.

2. A method as in claim 1 wherein the broadcast signal includes a decoder box temporary identification digital code number to enable the decoder box to receive the telephone communication from the central computer.

3. A method as in claim 1 including the step of transmitting the program code to said non-volatile memory which is an integral part of a solid-state large-scale integrated microcomputer central processing unit.

4. A method as in claim 1 wherein the scrambling is by frequency multiplexing base band audio segments between subcarriers.

5. A method as in claim 4 wherein the length of time of the multiplexed segments are selectively varied in duration in a time sequence.

6. The method as in claim 1 wherein the viewer's selection of programs is temporarily stored in said non-volatile memory by program code number and is polled over the modem by said central computer.

7. A system for scrambling a television broadcast signal including:
   means for converting an unscrambled signal into a scrambled signal, means for broadcasting said scrambled signal and concurrently broadcasting a descrambling program identification code signal associated with each program of the scrambled signal; means for periodically broadcasting an enable code signal;
   a decoder box including means connectable to a television receiving set for receiving the enable code signal and broadcast signals and descrambling the said scrambled broadcast signals; said decoder box including descrambling means and enabling means to control said descrambling means; said enabling means including a non-volatile memory having a look-up table whose entries consist of a plurality of digital demultiplexing codes and corresponding in a one-to-one relationship therewith a plurality of said program identification codes; said decoder box including a telephone modem and means to enable said modem only on receipt of said enable code signal;
   central computer means for periodically, by a telephone-modem connection to said decoder box, immediately after said modem is enabled by said enable code signal, communicating a digital code resident identification number to the decoder box and changing the entries of the said look-up table; and
   a read-only memory containing a resident ID digital code decoder box identification number which is not readable externally of said decoder box, means to enable said descrambling only upon periodic receipt of said resident identification number from the central computer means.

8. A system as in claim 7 wherein said read-only memory and a solid-state integrated circuit microcomputer central processing unit are formed on the same substrate.

9. A system as in claim 8 wherein the read-only memory is an integral part of a solid-state large-scale integrated microcomputer processing unit.

10. A system as in claim 9 wherein the broadcast code signal include a temporary identification number, unique to each decoder box, to enable the box periodically to receive the telephone communication from the central computer.

11. A system as in claim 7 wherein the scrambling is of the audio base band.

12. A system as in claim 7 and including means to store the viewer's selection of programs as coded by the program code in said alterable memory and means for polling said stored viewer selected program code over the modem by said central computer.

13. A system as in claim 7 including telephone response means which establishes a two-way data communication path for the exchange of data between the central computer and the decoder box modem without ringing of a telephone.

* * * * *